US010394927B2

(12) United States Patent
Hatayama (10) Patent No.: US 10,394,927 B2
(45) Date of Patent: Aug. 27, 2019

(54) ELECTRONIC APPARATUS, ELECTRONIC APPARATUS SYSTEM, GRAPHING METHOD, AND NON-TRANSITORY COMPUTER-READABLE RECORDING MEDIUM

(71) Applicant: CASIO COMPUTER CO., LTD., Shibuya-ku, Tokyo (JP)

(72) Inventor: Takashi Hatayama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/904,197

(22) Filed: Feb. 23, 2018

(65) Prior Publication Data

US 2018/0276180 A1     Sep. 27, 2018

(30) Foreign Application Priority Data

Mar. 22, 2017   (JP) ................. 2017-055638

(51) Int. Cl.
*G06F 17/11* (2006.01)
*G06T 11/20* (2006.01)
(Continued)

(52) U.S. Cl.
CPC ............ *G06F 17/11* (2013.01); *G06F 7/38* (2013.01); *G06F 15/00* (2013.01); *G06F 17/10* (2013.01);
(Continued)

(58) Field of Classification Search
CPC . G06F 17/11; G06F 7/38; G06F 15/00; G06F 17/10; G06F 17/18; G06T 11/206; G09B 23/02; G09B 23/06
(Continued)

(56) References Cited

U.S. PATENT DOCUMENTS

| 4,980,840 | A | * | 12/1990 | Yin ....................... G06F 17/215 345/467 |
| 2014/0210828 | A1 | * | 7/2014 | Fleizach ............... G06F 3/0488 345/467 |
| 2014/0285528 | A1 | * | 9/2014 | Yoshizawa .......... G06F 3/04812 345/676 |
| 2015/0149455 | A1 | * | 5/2015 | Whitley, Jr. ...... G06F 16/24553 707/734 |

FOREIGN PATENT DOCUMENTS

| JP | 2000250391 A | 9/2000 |
| JP | 2003131655 A | 5/2003 |
| JP | 2005071147 A | 3/2005 |

OTHER PUBLICATIONS

Fx-CG10 fx-CG20 fx-CG20 AU Software Version 2.02 User's Guide.
(Continued)

*Primary Examiner* — Tan V Mai
(74) *Attorney, Agent, or Firm* — Holtz, Holtz & Volek PC (57) ABSTRACT

An electronic apparatus according to an embodiment comprises: at least one processor; and at least one memory storing instructions. The instructions are executed by the at least one processor to perform: identifying at least one scientific theoretical formula relating to one or more scientific characteristics of which data is measured, setting a coordinate system that includes a coordinate axis to which at least a part of the identified at least one scientific theoretical formula is assigned, and plotting the measured data of the one or more scientific characteristics on the set coordinate system to display a first graph on a display.

22 Claims, 6 Drawing Sheets

(51) Int. Cl.
*G06F 7/38* (2006.01)
*G06F 17/18* (2006.01)
*G06F 17/10* (2006.01)
*G06F 15/00* (2006.01)
*G09B 23/02* (2006.01)
*G09B 23/06* (2006.01)

(52) U.S. Cl.
CPC ............ *G06F 17/18* (2013.01); *G06T 11/206* (2013.01); *G09B 23/02* (2013.01); *G09B 23/06* (2013.01)

(58) Field of Classification Search
USPC .......................................................... 708/100
See application file for complete search history.

(56) References Cited

OTHER PUBLICATIONS

Extended European Search Report (EESR) dated Apr. 5, 2019, issued in counterpart European Application No. 18158442.6.
Casio, "E-CON2", User Manual, Dec. 2002, XP055574139, retrieved from the Internet: <https://support.casio.com/pdf/004/e_con2_manual.pdf>.
Zachariadou, et al., "A low-cost computer-controlled Arduino-based educational laboratory system for teaching the fundamentals of photovoltaic cells", European Journal of Physics, vol. 33, No. 6, Sep. 11, 2012, pp. 1599-1610, XP020231045.

* cited by examiner

FIG. 2

12b (SENSOR DATABASE)

| SENSOR ID | SENSOR CHARACTERISTIC ||
|---|---|---|
| | KIND | UNIT |
| 0001 | CURRENT | A |
| 0002 | VOLTAGE | V |
| 0003 | TEMPERATURE | °C |
| ⋮ | ⋮ | ⋮ |
| ⋮ | ⋮ | ⋮ |

FIG. 3

12c (FORMULA DATABASE)

| FORMULA (SCIENTIFIC THEORETICAL FORMULA) | KIND OF SENSOR | REGRESSION FORMULA |
|---|---|---|
| $V=RI$ | I (CURRENT), V (VOLTAGE) | $y=ax+b$ |
| $W=VI=RI^2$ | I (CURRENT), V (VOLTAGE) | $y=ax^2+bx+c$ |
| $L=L_0+V_0T+\frac{1}{2}aT^2$ | L (DISTANCE) | $y=ax^2+bx+c$ |
| ⋮ | ⋮ | ⋮ |

ELECTRONIC APPARATUS, ELECTRONIC APPARATUS SYSTEM, GRAPHING METHOD, AND NON-TRANSITORY COMPUTER-READABLE RECORDING MEDIUM

CROSS-REFERENCE TO RELATED APPLICATION

This application claims priority to Japanese Patent Application No. 2017-055638 filed on Mar. 22, 2017, which is incorporated herein by reference in its entirety.

BACKGROUND

1. Technical Field

The technical field relates to an electronic apparatus, an electronic apparatus system, a graphing method, and a non-transitory computer-readable recording medium.

2. Description of Related Art

Examples of apparatuses that have been used for creating graphs from data measured by sensors include those using desk calculators or personal computers. In any example, scientific characteristics, such as voltage, current, pressure, and temperature, are measured by sensors, and the measured data is plotted during or after the measurement on a coordinate system including coordinate axes, which are set separately. As a result, a graph is displayed on a display. In some examples, the coordinate system in which a horizontal axis represents time and a vertical axis represents measured scientific characteristics is automatically set. In other examples, the coordinate axes are predetermined manually by the user. In general, these drawing apparatuses have often been used in class to enhance the learning effect of formulas (scientific theoretical formula) learned in, for example, physics and chemistry classes.

In one example of such apparatuses, fx-CG10 or fx-CG20, for example, manufactured by Casio Computer, Co., Ltd. has been known. The instruction manual of such apparatuses is available on the web as of Feb. 23, 2017 in http://support.casio.com/pdf/004/fx-CG10_20_Soft_E.pdf (see E-CON3 Application in particular).

BRIEF SUMMARY

An electronic apparatus according to an embodiment comprises: at least one processor; and at least one memory storing instructions. The instructions are executed by the at least one processor to perform: identifying at least one scientific theoretical formula relating to one or more scientific characteristics of which data is measured, setting a coordinate system that includes a coordinate axis to which at least a part of the identified at least one scientific theoretical formula is assigned, and plotting the measured data of the one or more scientific characteristics on the set coordinate system to display a first graph on a display.

BRIEF DESCRIPTION OF THE DRAWINGS

The components in the drawings are not necessarily to scale relative to each other.

FIGS. 7A and 7B are graphs created and displayed according to the graphing processing of the measurement data analytical processing, in which

DETAILED DESCRIPTION

Embodiments of the present invention will be described below by referring to the accompanying drawings.

Figure 1:
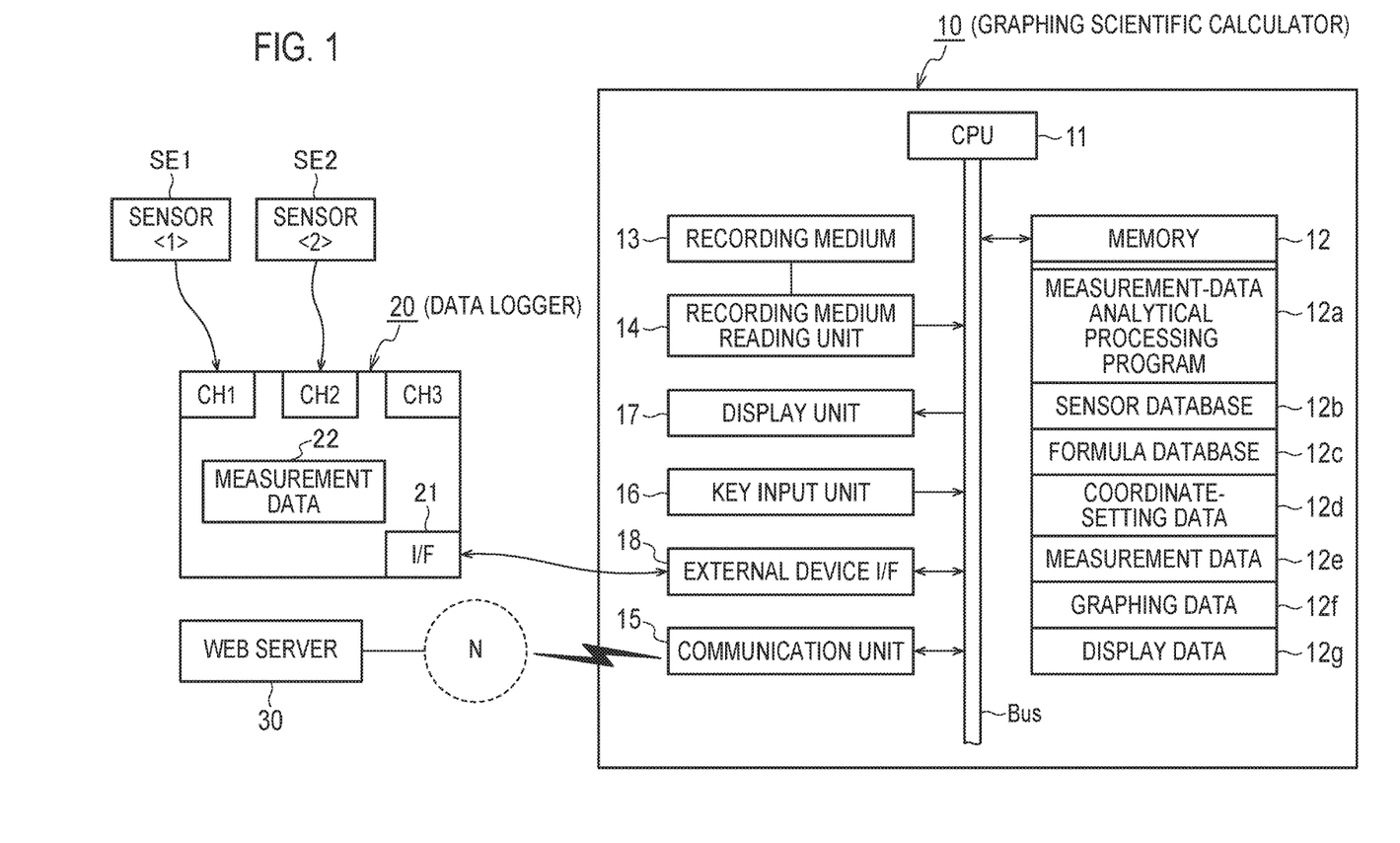
FIG. 1 is a block diagram illustrating a configuration of an electronic circuit of a graphing scientific calculator 10 according to an embodiment of an electronic apparatus of the present invention.

FIG. 1 is a block diagram illustrating a configuration of an electronic circuit of a graphing scientific calculator 10 according to an embodiment of an electronic apparatus of the present invention.

The electronic apparatus can be formed as the graphing scientific calculator 10 or a tablet terminal. In addition, the electronic apparatus can also be formed as a personal computer, a smartphone, a mobile phone, a touch-panel personal digital assistant (PDA), an electronic book, a portable gaming console, or the like including input and graphing functions (i.e., implementing a measurement-data analytical processing program) of measurement data (scientific characteristics).

An electronic apparatus, such as a tablet terminal which does not include keys (buttons) physically as those of the graphing scientific calculator 10 displays a software keyboard similar to the keys of the graphing scientific calculator 10 to enable processing according to the operation of the keys of the software keyboard.

The graphing scientific calculator 10 is described below.

An electronic circuit of the graphing scientific calculator 10 includes a central processing unit (CPU) 11 provided as a computer, to which a memory 12, a recording medium reading unit 14, a communication unit 15, a key input unit 16, a display unit 17, and an external device interface (I/F) 18 are connected via a control and data bus Bus.

The CPU 11 controls operations of each unit of the circuit according to a measurement-data analytical processing program 12a stored in the memory 12, and executes various kinds of calculation processing corresponding to key input signals from the key input unit 16. The measurement-data analytical processing program 12a may be previously stored in the memory 12, or may be read by the recording medium reading unit 14 from the external recording medium 13, such as a memory card, and stored in the memory 12. Alternatively, the measurement-data analytical processing program 12a may be downloaded from an external web server 30, which is accessible via the communication unit 15 and a communication network (Internet) N, and stored in the memory 12. The measurement-data analytical processing program 12a is unrewritable by the user through the operation of the key input unit 16.

The memory 12 also stores sensor database 12b and formula database 12c as user-unrewritable data.

Figure 2:
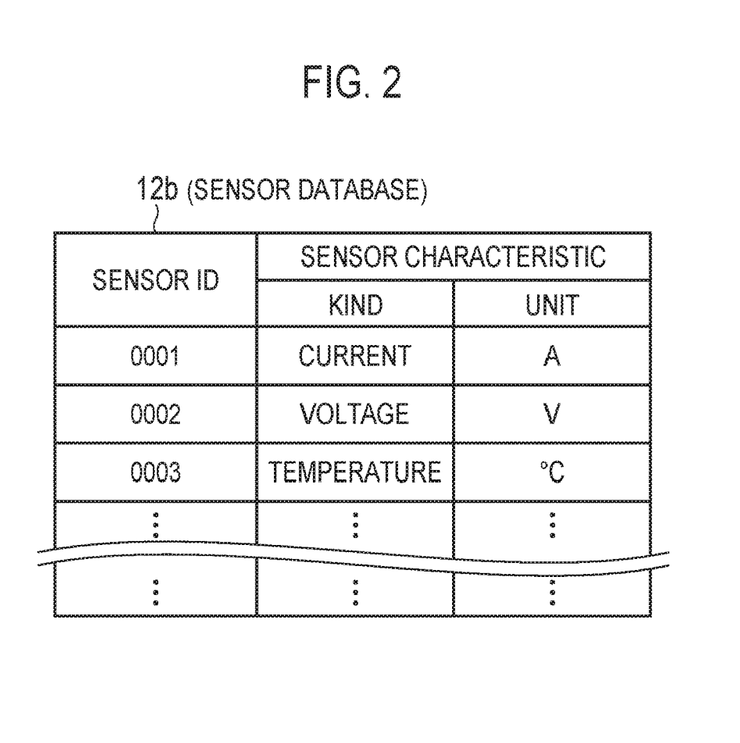
FIG. 2 illustrates contents of a sensor database 12b stored in a memory 12 of the graphing scientific calculator 10.

FIG. 2 illustrates contents of the sensor database 12b stored in the memory 12 of the graphing scientific calculator 10.

The sensor database 12b includes sensor IDs [0001], [0002], [0003], and so on for identifying sensors that measure various kinds of data including current, voltage, temperature, pressure, acceleration, and so on. Corresponding to the sensor IDs, the sensor database 12b stores kinds (kinds of sensors) of data (scientific characteristics) to be measured by the sensors, such as [current], [voltage], [temperature], and so on and output units [A], [V], [° C.], and so on of the measurement data (scientific characteristics).

Figure 3:
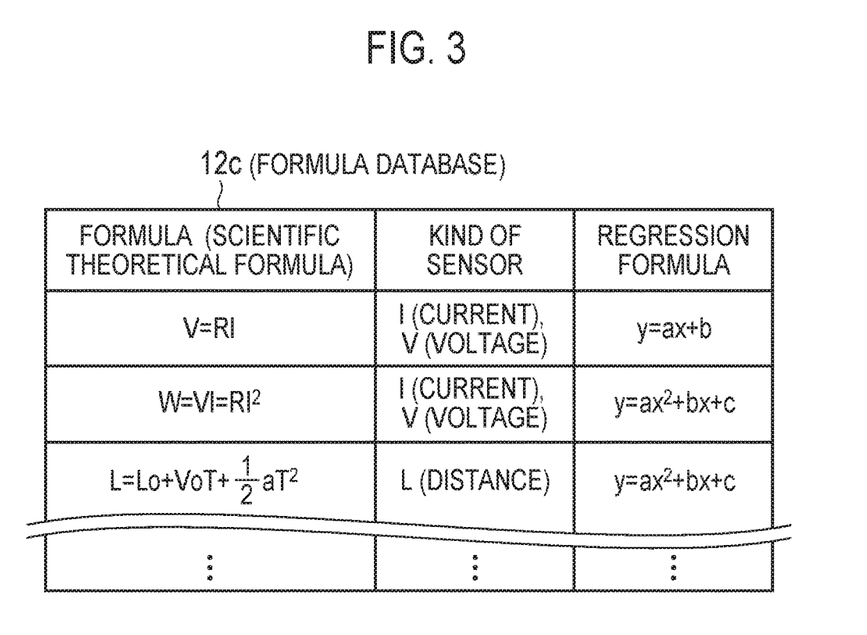
FIG. 3 illustrates contents of a formula database 12c stored in the memory 12 of the graphing scientific calculator 10.

FIG. 3 illustrates contents of the formula database 12c stored in the memory 12 of the graphing scientific calculator 10.

The formula database 12c includes kinds of data (one or more) (kinds of sensors) to be measured by the sensors stored in the sensor database 12b. Corresponding to the kinds of the sensors, the formula database 12c stores various kinds of formulas (scientific theoretical formulas) that include data of the corresponding kind as an element of the formula, and regression formulas corresponding to such formulas.

As illustrated in FIG. 3, the formula database 12c stores two formulas representing the relationship between current I(A) and voltage V(V) in the first and second lines, and stores a formula representing the relationship between a distance L(m) and time T(s) in the third line.

The formula database 12c also stores unit conversion formulas for converting the unit of measurement data to a predetermined unit of the formula, if the unit of the data measured by the sensor does not match the unit of the elements of the formula.

In the area of the memory 12 for storing rewritable data, there are a coordinate-setting data area 12d, a measurement data area 12e, a graphing data area 12f, and a display data area 12g.

The coordinate-setting data area 12d stores kinds of data measured by one or more sensors and data of the coordinate region (coordinate system) (Xmin, max/Ymin, max) for graphing, which is set according to the values of the measurement data.

The measurement data area 12e stores measurement data (scientific characteristics) measured by one or more sensors, that is, sensor <1> SE1, sensor <2> SE2, and so on, and input through a data logger 20 connected to the external device I/F 18.

The graphing data area 12f stores graphing data of the measurement result graph generated by plotting the measurement data, which is stored in the measurement data area 12e, in accordance with the coordinate region (coordinate system) stored in the coordinate-setting data area 12d.

The display data area 12g includes a memory area corresponding to the size of a display screen of a liquid crystal display unit that forms the display unit 17. The memory area stores display data to be displayed on the display screen as bit map data (bit map data developed corresponding to the coordinate region data and the graphing data).

The data logger 20 includes an I/F 21 for connecting to the external device I/F 18, channels CH1, CH2, and so on for connecting to the sensors, i.e., sensor <1> SE1, sensor <2> SE2, and so on, and a measurement data memory 22 that temporarily stores measurement data (scientific characteristics) of the sensors, i.e., sensor <1> SE1, sensor <2> SE2, and so on, input through the channels CH1, CH2, and so on.

In the graphing scientific calculator (electronic apparatus) 10 configured as described above, the CPU 11 controls the operations of each unit of the circuit in accordance with commands described in the measurement-data analytical processing program 12a to enable cooperation of software and hardware. Thus, the measurement data analytical function, which will be described later in the description of operation, is achieved.

Next, the operation according to the measurement-data analytic function of the graphing scientific calculator 10 configured as above is described.

Figure 4:
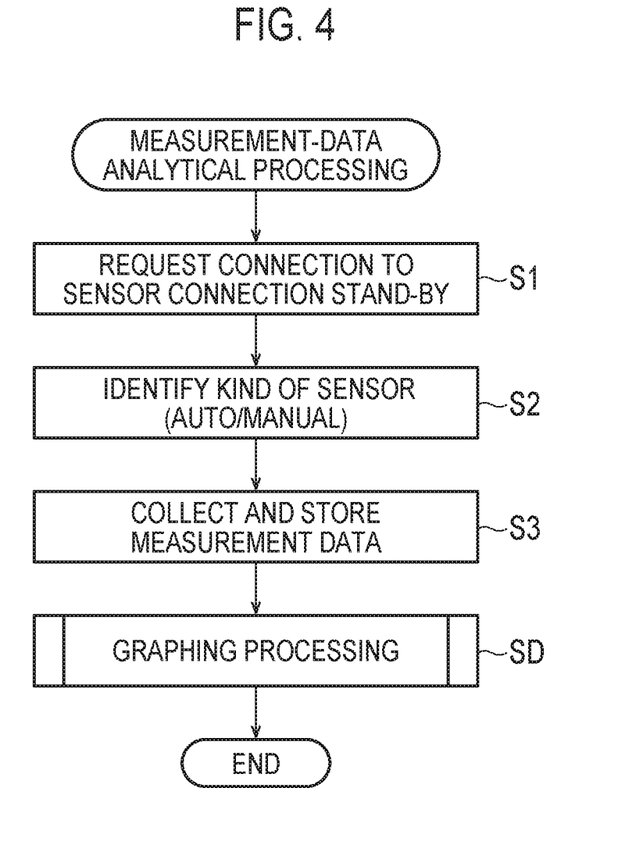
FIG. 4 is a flowchart illustrating measurement-data analytical processing of the graphing scientific calculator 10.

FIG. 4 is a flowchart illustrating the measurement-data analytic processing of the graphing scientific calculator 10.

Figure 5:
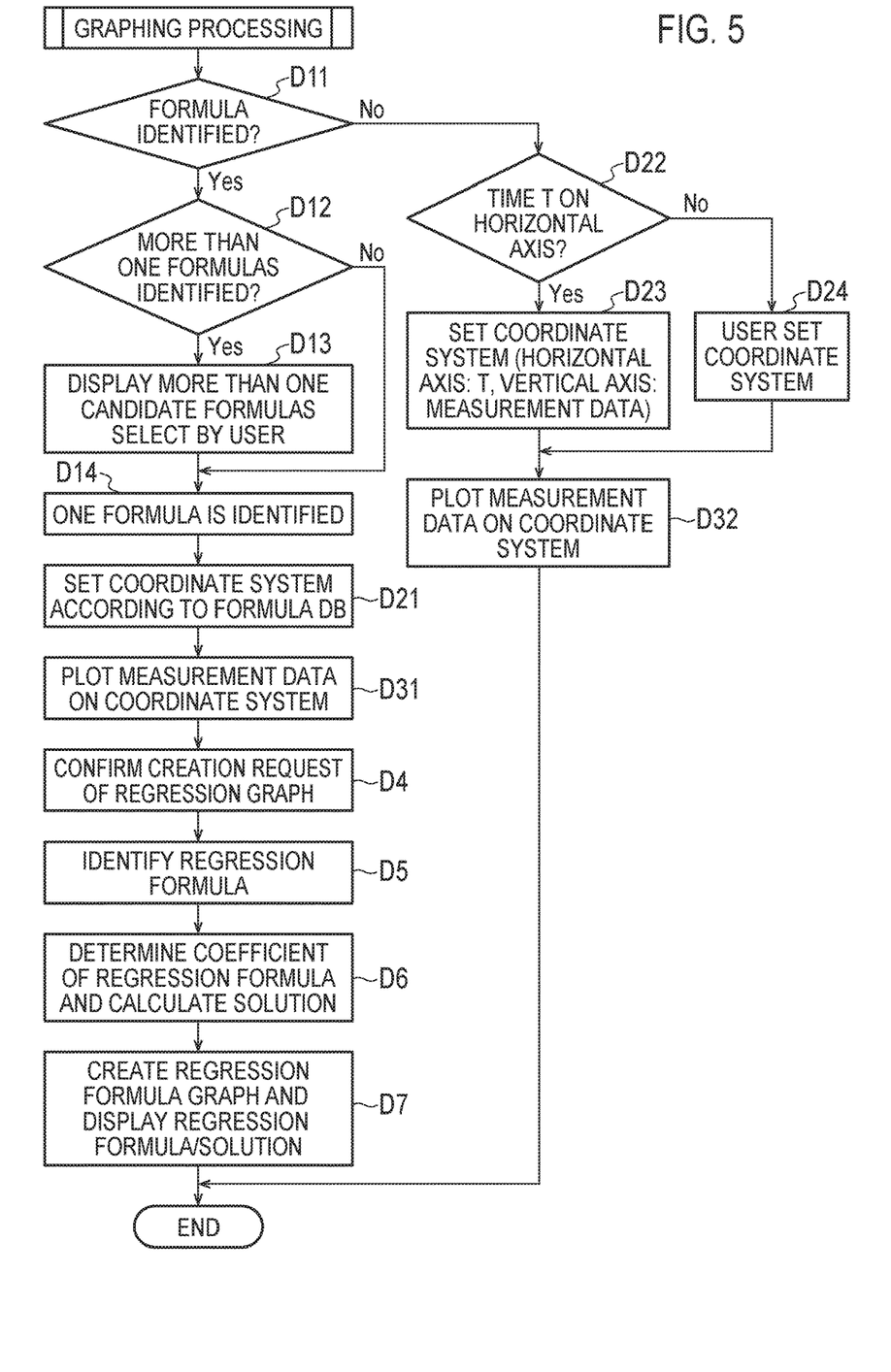
FIG. 5 is a flowchart illustrating graphing processing of the measurement-data analytical processing of the graphing scientific calculator 10.

FIG. 5 is a flowchart illustrating graphing processing in the analytical processing of the measurement-data of the graphing scientific calculator 10.

Figure 6:
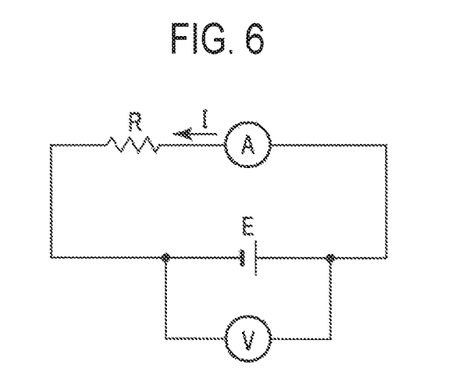
FIG. 6 is a circuit diagram of a direct-current circuit to be measured in an embodiment of the measurement-data analytical processing.

FIG. 6 is a circuit diagram of a direct-current circuit to be measured in an embodiment of the measurement-data analytical processing.

As illustrated in FIG. 6, the present embodiment takes a direct-current circuit, in which the direct current power source E is applied to resistance R, as an example to describe an analytic operation of the voltage V and the current I flowing through the resistance R, when the voltage V of the power source E changes.

When the CPU 11 starts the measurement-data analytical processing program 12a in response to the user operation of the key input unit 16, a message requiring connection to the sensor is displayed on the display unit 17 and the connection stand-by state starts (step S1).

Subsequently, the user connects a current sensor <1> SE1 to the channel CH1 and connects a voltage sensor <2> SE2 to channel CH2 of the data logger 20 that is connected to the external device I/F 18. As a result, the sensor IDs [0001] and [0002] of the sensors <1> SE1 and <2> SE2, respectively, are read. According to the sensor database 12b (see FIG. 2), the kinds of the sensors <1> SE1 [ID=0001] and <2> SE2 [ID=0002] are automatically identified as a current sensor and a voltage sensor, respectively (step S2).

Alternatively, in response to the user operation of the key input unit 16, the sensors <1> SE1 connected to the channel CH1 and the sensor <2> SE2 connected to the channel CH2 of the data logger 20 may be manually identified as the current sensor and the voltage sensor, respectively.

When the user operates the key input unit 16 to start measurement by the current sensor <1> SE1 and the voltage sensor <2> SE2, the measurement data of the current I(A) measured by the sensor <1> SE1 and the measurement data of the voltage V(V) measured by the sensor <2> SE2 are collected according to a sampling period and the number of sampling which both are set by the user or preset. The collected measurement data is stored in the measurement data area 12*e* in the memory 12 (step S3).

If the sampling period of the measurement data exceeds data transfer speed between the external device I/F 18 and the data logger 20, the measurement data I(A) and V(V) is temporarily stored in the measurement data memory 22 in the data logger 20. Subsequently, the graphing scientific calculator 10 collects the data together and stores them in the measurement data area 12*e*.

Once the measurement data of the current and the voltage I(A) and V(V) measured by the current sensor <1> SE1 and the voltage sensor <2> SE2 are collected and stored, the graphing processing (see FIG. 5) corresponding to the stored measurement data I(A) and V(V) is executed (step SD).

Figure 7A:
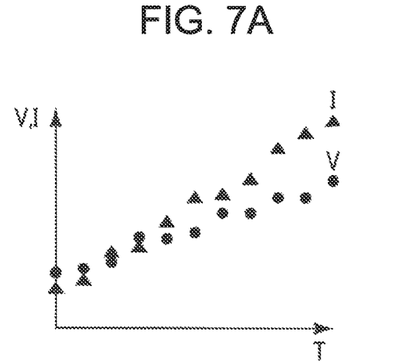
FIG. 7A is a graph plotting the measurement result, where the horizontal axis represents time T(s) and the vertical axis represents measurement data I(A) and V(V) of the current and the voltage, respectively.
Figure 7B:
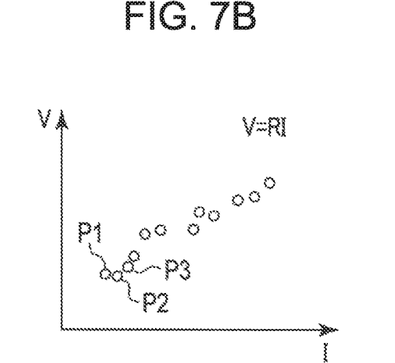
FIG. 7B is a graph plotting the measurement result corresponding to a formula V=RI, where the horizontal axis represents measurement data I(A) of the electric current and the vertical axis represents the measurement data V(V) of the voltage.

FIGS. 7A and 7B are graphs plotted and displayed according to the graphing processing of the measurement data analytical processing, in which FIG. 7A is a graph plotting the measurement result, where the horizontal axis represents time T(s) and the vertical axis represents measurement data I(A) and V(V) of the current and the voltage, respectively, and FIG. 7B is a graph plotting the measurement result corresponding to a formula V=RI, where the horizontal axis represents measurement data I(A) of the electric current and the vertical axis represents the measurement data V(V) of the voltage.

Figure 8:
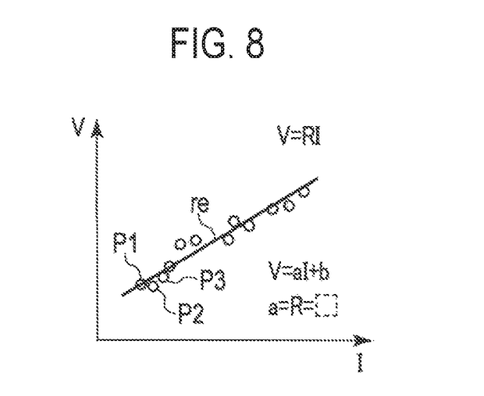
FIG. 8 is a graph plotting the measurement result corresponding to the formula V=RI, where the horizontal axis represents the measurement data I(A) of the electric current and the vertical axis represents the measurement data V(V) of the voltage, and a regression graph re and a regression formula [V=aI+b] are additionally plotted on the graph.

FIG. 8 is a graph plotting the measurement result corresponding to the formula V=RI, where the horizontal axis represents the measurement data I(A) of the electric current and the vertical axis represents the measurement data V(V) of the voltage, and a regression graph re and a regression formula [V=aI+b] are additionally plotted on the graph.

When the graphing processing (see FIG. 5) starts, formulas including elements corresponding to the kinds of sensors (sensor <1> SE1: current sensor, sensor <2> SE2: voltage sensor) that have been identified in step S2 and are currently connected according to the formula database 12*c* (see FIG. 3) in the memory 12 are identified. Specifically, the presence of two formulas [V=RI] and [W=VI=RI$^2$] is identified as the formulas including the element of at least one of the current I or voltage V in the column of the kind of sensors in the formula database 12*c* (step D11: Yes, step D12: Yes).

Subsequently, the display unit 17 displays a message to urge selection of one of the two formulas, and one formula is selected corresponding to the user operation (step D13). An example of identifying the formula [V=RI] by the user selection is described (step D14).

When the presence of more than one formula is identified corresponding to the kinds of sensors that are currently connected, it is assumed that a formula is identified when one of the formulas is selected corresponding to the user operation. Other cases, such as a case where the presence of only one formula is identified corresponding to the kinds of sensors that are currently connected, or a case where no presence of the formula is identified corresponding to the kinds of sensors that are currently connected, will be described later.

When the formula is identified by the step D14 by the above processing, a coordinate system including coordinate axes with a part of the identified formula assigned at least one of the horizontal axes or vertical axis are set (step D21). The present embodiment determines whether a part of the identified formula includes at least one term among a term corresponding to the measured data, a term corresponding to time when the data is measured (elapsed time from a reference point of time), and a term corresponding to a calculation value of at least one of the former two terms. If any term is included, the term is automatically assigned to the horizontal and vertical axes. By doing this, the coordinate values to be plotted on the coordinate system determined in step D21 are already known when the measurement data is obtained, so that a graph can be uniquely generated using the measurement data according to the identified formula.

Preferably, the right side of the formula is assigned to the horizontal axis and the left side thereof is assigned to the vertical axis. This facilitates understanding of a corresponding relationship between the formula and the graph, thus contributing, probably, to an increase of the learning effect. In terms of achieving the purpose of learning, however, the right side may be assigned to the vertical axis and the left side may be assigned to the horizontal axis.

The processing performed in step D21 is specifically described. When the formula [V=RI] is identified in step D14 described above, it is determined that the measured data, current I(A), is included in the right side of the formula, and the measured data, voltage V(V), is included in the left side of the formula. Thus, in this case, the right side is assigned to the horizontal axis so that current I(A) is assigned to the horizontal axis, while the left side is assigned to the vertical axis so that voltage V(V) is assigned to the vertical axis. Such a coordinate system is set automatically. A coordinate range of the horizontal and vertical axes of the set coordinate system is also set automatically so that the maximum and minimum values of current I(A) and voltage V(V) of the measurement data can at least be plotted. Specifically, data of the coordinate region (coordinate system) including the horizontal axis representing Imin to Imax(A) and the vertical axis representing Vmin to Vmax (V) is set corresponding to the identified formula [V=RI] and the measurement data I(A) and V(V) stored in the measurement data area 12*e*. The data is then stored in the coordinate-setting data area 12*d* in the memory 12.

As illustrated in FIG. 7B, the display unit 17 displays the coordinate region (coordinate system) with the horizontal axis I(A) and the vertical axis V(V) in accordance with the coordinate region data stored in the coordinate-setting data area 12*d*. The measurement data I(A) and V(V) stored in the measurement data area 12*e* is plotted as indicated by P1, P2, and so on, on the coordinate region. Further, the identified formula [V=RI] is displayed (step D31).

Alternatively, two graphs as illustrated in FIGS. 7A and 7B may be displayed side-by-side, where FIG. 7A is the graph of the measurement result plotting time T along the horizontal axis and the measurement data I(A) and V(V) along the vertical axis, and FIG. 7B is the measurement result graph corresponding to the formula [V=RI].

Thus, the measurement result graphs corresponding to the formula [V=RI] which includes the measurement data as the element of the formula for the measurement data I(A) and V(V) measured by the current sensor <1> SE1 and the voltage sensor <2> SE2 are plotted and displayed. In response to this, the display unit 17 displays a message for requesting a user to confirm whether the user requests creation of a regression graph corresponding to the graphs of the measurement result (step D4).

When the CPU 11 confirms the user request of plotting the regression graph, a regression formula [y=ax+b] corresponding to the formula [V=RI] that has been identified in the former step D1 according to the formula database 12*c* (see FIG. 3) in the memory 12 is identified (step D5).

A coefficient a that is unknown is determined in accordance with the regression formula [V=aI+b] which is generated by assigning each element of the formula [V=RI] to each element of the regression formula [y=ax+b]. The solution (coefficient) of the measurement data I(A) and V(V) is calculated as the value of the resistance R(Ω) (step D6).

As illustrated in FIG. 8, a regression graph re corresponding to the regression formula [V=aI+b] to which the value of the coefficient a is inserted is plotted over the same coordinate region as that of the graph of the measurement result plotting the measurement data I(A) and V(V) as indicated by P1, P2, and so on corresponding to the formula [V=RI]. Further, the regression formula [V=aI+b] and its solution a (=R) are also displayed (step D7).

As described above, the measurement result graph plotted by identifying the formula [V=RI] according to the steps D1 to D3 (see FIG. 7B) is plotted by collecting and storing the measurement data I(A) and V(V) in the measurement data area 12e, and graphing the stored measurement data I(A) and V(V) as indicated by P1, P2, and so on. Alternatively, the measurement data I(A) and V(V) may be plotted real-time as indicated by P1, P2, and so on every time the measurement data I(A) and V(V) from the sensors <1> SE and <2> SE2 is input via the data logger 20 and the external device I/F 18.

The example of the graphing processing has been described above. Next, a case where only one formula is identified corresponding to the kinds of sensors that are currently connected is described. In this case, the user operation of selecting the formula, which is carried out when more than one corresponding formulas are present, can be skipped. For example, assume that the formula database 12c stores only one formula corresponding to a distance sensor as in the third line of FIG. 3. If the distance sensor is only connected to the data logger 20 in this case, one formula [$L=L_0+V_0T+(1/2)aT^2$] corresponding to the distance sensor is identified in the formula database 12c and, therefore, the formula may be automatically identified without requiring the user operation (steps D11: Yes, D12: No, D14).

When the formula [$L=L_0+V_0T+(1/2)aT^2$] is identified by the processing described above in step D14, it is determined whether a part of the identified formula includes at least one term among the term corresponding to the measured data, the term corresponding to time when the data is measured (elapsed time from the reference point of time), and the term corresponding to the calculation values of at least one of the former two terms. In the case of the formula [$L=L_0+V_0T+(1/2)aT^2$], the measured data is a distance L(m). This means that [L] on the left side of the formula corresponds to "the term representing the measured data", and time t(s) corresponds to "the term representing the time when the data is measured (elapsed time from the reference point of time)". As a result, the coordinate system in which the time T(s) is assigned to the horizontal axis and the distance L (m) is assigned to the vertical axis in accordance with the formula [$L=L_0+V_0T+(1/2)aT^2$] is set automatically. Since [$L_0$], [$V_0$], and [a] are unknown when the measurement data is obtained, the coordinate values for graphing cannot be determined if those terms are assigned to the axes. [$L_0$], [$V_0$], or [a], or at least one of these calculation values are not assigned to the horizontal or vertical axis.

The coordinate range of the horizontal axis of the coordinate system having been automatically set to allow at least plotting of the maximum and minimum values of time T(s), and the coordinate range of the vertical axis having been automatically set to allow at least plotting of the maximum and minimum values of distance L(m), are stored in the coordinate-setting data area 12d in the memory 12.

Figure 9:
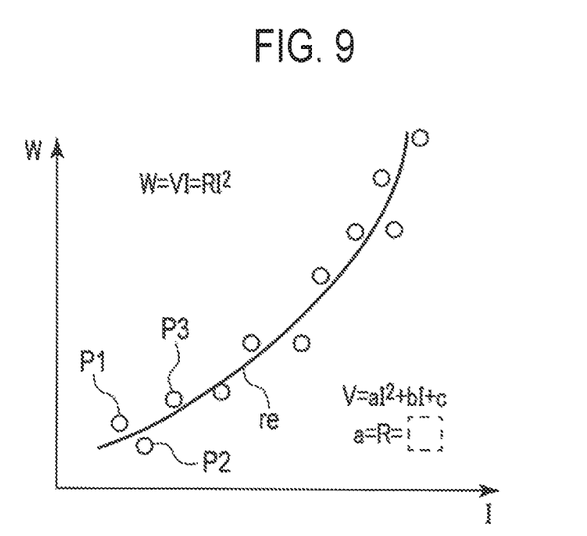
FIG. 9 is a graph corresponding to a formula $[W=VI=RI^2]$, where the horizontal axis represents the measurement data I(A) of the electric current and the vertical axis represents [W] which is measurement data of voltage V(V) multiplied by measurement data of current I(A), to which a regression graph re and a regression formula $[W=aI^2+bI+c]$ are additionally plotted on the graph.

As illustrated in FIG. 9, the display unit 17 displays the coordinate region (coordinate system) with the horizontal axis representing time T(s) and the vertical axis representing the distance L(m) in accordance with the coordinate region data stored in the coordinate-setting data area 12d. The measurement data stored in the measurement data area 12e and the calculation values are plotted on the coordinate region. Further, the identified formula [$L=L_0+V_0T+(1/2)aT^2$] is displayed (step D31).

Post-processing of the graphing in step D31 is similar to that of the former embodiment, and the description thereof will not be repeated.

Next, description is given as to a case where no formula including any element of the expression corresponding to the kinds of sensors, which are currently connected and identified in step S2, is identified in step D11 of the graphing processing illustrated in FIG. 5.

If no formula including any element of the expression corresponding to the kinds of sensors that are currently connected is found in the formula database 12c in step D11, that is, no formula is identified, the process proceeds to step D22.

In step D22, the display unit 17 displays a message to request confirmation as to whether time T(s) is assigned to the horizontal axis and the measurement data from the sensors that are currently connected is assigned to the vertical axis. Accordingly, [Yes] or [No] is selected by the user operation (step D22: Yes/No).

If [Yes] is selected in step D22, the coordinate system including the coordinate axes in which time T(s) is assigned to the horizontal axis and the measurement data of at least 1 is assigned to the vertical axis is set (step D23). In the coordinate system having been set, the coordinate range of the horizontal axis is set automatically to allow plotting of the entire time during which the measurement is carried out. The coordinate range of at least 1 of the vertical axis is automatically set to allow at least plotting of the maximum and minimum values of the measurement data of at least 1. Accordingly, each value is stored in the coordinate-setting data area 12d in the memory 12.

Subsequently, the display unit 17 displays the coordinate region (coordinate system) having been set in accordance with the coordinate region data stored in the coordinate-setting data area 12d. Over the coordinate region, the measurement data having been stored in the measurement data area 12e is plotted. In this case, no formula is identified, and no formula is displayed (step D32).

When no formula is specified, no regression formula is known. Therefore, the processing of steps D4, D5, D6, and D7 is not executed and the graphing processing ends.

As described above, if the formula identified in step D14 includes "the term corresponding to the measured data" and "the term corresponding to the time (elapsed time from the reference point of time) when the data is measured", the coordinate region (coordinate system) including the horizontal axis representing time T(s) and the vertical axis representing the measurement data is set. Meanwhile, if no formula is identified as described above (step D11: No), and if the user operation selects time T(s) to be assigned to the horizontal axis and the measurement data from the sensors that are currently connected to be assigned to the vertical axis (step D22: Yes), the coordinate system including the coordinate axis in which the horizontal axis represents time T(s) and the vertical axis represents one or more pieces of the measurement data is set(step D23).

Thus, the graphs displayed on the display unit 17 under different conditions consequently look similar to each other. In the present embodiment, the processing of step D14 of FIG. 5 is carried out when [Yes] is selected or the formula is identified in step D11. In this case, the identified formula ($[L=L_0+V_0T+(1/2)aT^2]$ in the example above) and its graph are displayed. In contrast, it is indeed impossible to display the formula if no formula is identified, as there is no formula to be displayed and only a graph is displayed.

Next, a case where [No] is selected in step D22 is described. The display unit 17 displays the message for requesting how to set the values to be assigned to the horizontal and vertical axes. The values to be assigned to the horizontal and vertical axes are determined according to the user operation. It is determined whether the values designated by the user to be assigned to the horizontal and vertical axes are the measured data, the time when the data is measured (elapsed time from the reference point of time), or calculation values of at least one of the measured data and the time. The determination is carried out because, if the designated values are one of those values described above, the coordinate values to be plotted on the coordinate system determined in step D24 are known, so that the graph can be uniquely generated using the measurement data. If the values designated by the user do not meet the above condition, an error is determined and the graphing processing ends.

If the values designated by the user meet the above conditions in step D24, the coordinate system including the coordinate axes to which the values designated by the user are assigned to the horizontal and vertical axes is set (step D24). The values assigned to the horizontal and vertical axes of the coordinate system having been set are calculated. The coordinate range of the coordinate system is automatically set so as to allow at least plotting of the maximum and minimum values of the calculated values. Then, the values are stored in the coordinate-setting data area 12d in the memory 12.

Subsequently, the display unit 17 displays the coordinate region (coordinate system) having been set in accordance with the coordinate region data stored in the coordinate-setting data area 12d. Over the coordinate region, the measurement data having been stored in the measurement data area 12e is plotted. Since no formula is identified, no formula is displayed (step D32).

When no formula is specified, no regression formula is known. Therefore, the processing of steps D4, D5, D6, and D7 is not executed and the graphing processing ends.

Alternatively, if no formula including the elements of the expression corresponding to the kinds of sensors that are currently connected and identified in step S2 is identified in the graphing processing of step D11 of FIG. 5, the processing of step D22 is skipped and the coordinate system including the coordinate axes to which time T(s) is assigned to the horizontal axis and the measurement data is assigned to the vertical axis may be set automatically.

The graphing scientific calculator 10 has the measurement data analytical function as described above. When the current sensor <1> SE1 and the voltage sensor <2> SE2 are connected, the kinds ([current] and [voltage]) of the sensors <1> SE1 and <2> SE2 are identified from the sensor database 12b in the memory 12 in accordance with the sensor IDs [0001] and [0002] of the sensors <1> SE1 and <2> SE2. In accordance with the kinds [current] and [voltage] of the sensors <1> SE1 and <2> SE2, the formula [V=RI] including the kinds [current] and [voltage] of the sensors <1> SE1 and <2> SE2 as the elements of the formula is identified from the formula database 12c in the memory 12. Accordingly, the display unit 17 displays the graph of the measurement result by setting the coordinate region (coordinate system) including the horizontal axis I(A) and the vertical axis V(V) in accordance with the identified formula [V=RI], and plotting the measurement data I(A) and V(V) of the sensors <1> SE1 and <2> SE2 as indicated by P1, P2, and so on, on the coordinate region.

As described above, the coordinate system corresponding to the formula (scientific theoretical formula) regarding the scientific characteristics, for which the data is measured, can be automatically set to create a graph by plotting the measured data of the scientific characteristic.

Eventually, the formerly complicated user operations in graphing can be simplified to achieve the purpose of increasing the learning effect of the formulas that are taught in classes of physics, chemistry, and so on.

The operation example of the present embodiment has been described in that the graph plotting the current measurement data I(A) on the horizontal axis and the voltage measurement data on the vertical axis V(V) is displayed in response to the user selecting the formula [V=RI] identified corresponding to the current and voltage sensors <1> SE1 and <2> SE2, respectively, in step D13, and the regression graph re is created and displayed in accordance with the linear regression formula [V=aI+b].

Another operation example in which the user selects the formula $[W=VI=RI^2]$, which is identified corresponding to the current sensor <1> SE1 and the voltage sensor <2> SE2, in step D13 is described.

When the formula $[W=VI=RI^2]$ is identified by the processing in step D14, it is determined whether a part of the identified formula includes at least one term among the term corresponding to the measured data, the term corresponding to time when the data is measured (elapsed time from the reference point of time), and the term corresponding to the calculation values of at least one of the former two terms. In the case of the formula $[W=VI=RI^2]$, the measured data is current I(A) and voltage V(V), so that [I] and [VI] correspond to "the term representing the measured data" and "the term representing the calculation values of at least one of the measured data", respectively. As a result, the coordinate system in which the current I(A) is assigned to the horizontal axis and a product (V. I, or W) obtained by multiplying the current I(A) and the voltage V(V) is assigned to the vertical axis in accordance with the formula $[W=VI=RI^2]$ is automatically set. As to $[RI^2]$ on the right side of the formula, if R(Ω) is assigned to the axis, the coordinate values for graphing cannot be determined because R(Ω) is unknown when the measurement data is obtained. Thus, $[RI^2]$ is not going to be assigned to either horizontal or vertical axis.

Next, in the coordinate system having been set, the coordinate range of the horizontal axis is automatically set so as to allow at least plotting of the maximum and minimum values of current I(A), while the coordinate range of the vertical axis is automatically set so as to allow at least plotting of the maximum and minimum values of the product of current I(A) and voltage V(V). Both coordinate ranges are stored in the coordinate-setting data area 12d in the memory 12.

As illustrated in FIG. 9, the display unit 17 displays the coordinate region (coordinate system) with the horizontal axis representing I(A) and the vertical axis representing the product of current I(A) and voltage V(V) in accordance with the coordinate region data stored in the coordinate-setting data area 12d. The measurement data and calculation values stored in the measurement data area 12e are plotted on the coordinate region. Further, the identified formula $[V=VI=RI^2]$ is displayed (step D31).

Post-processing of the graphing in step D31 is similar to that of the former embodiment, and the description thereof will not be repeated.

The operation example of the present embodiment has been described in that the graph plotting the measurement result of the measurement data of the sensor <n> SEn is displayed in the coordinate region in which the horizontal and vertical axes corresponding to the formula identified according to the kind of the sensor <n> SEn are set. After confirming the user request of creating the regression graph, the regression formula corresponding to the formula is identified and the regression graph is created. Alternatively, the regression formula re may be created by automatically identifying the regression formula without confirming the user request after the plotting of the measurement result graph.

A method of the processing steps of the graphing apparatus (electronic apparatus) 10 described in the embodiments, that is, a method of the measurement data analytical processing illustrated in the flowchart of FIG. 4 and a method of the graphing processing of the measurement data analytical processing illustrated in the flowchart of FIG. 5 may both be implemented as a computer-executable program. Such a computer-executable program can be stored in a medium of an external recording apparatus, such as a memory card (e.g., a read only memory (ROM) card, a random access memory (RAM) card, and the like), a magnetic disc (e.g., a floppy disc (registered trademark), a hard disc, and the like), an optical disk (e.g., a compact disc (CD)-ROM, a digital versatile disc (DVD), and the like), or a semiconductor memory for distribution. A computer (CPU) of the electronic apparatus including a display function reads the program recorded in the medium of the external recording apparatus and controls the operation by the program having been read, thus achieving the measurement data analytical and graphing functions having been described in the embodiment, and executing the processing by the method described above.

Meanwhile, the data of the program for implementing the method can be transmitted through a communication network (N) as a program code. From the computer apparatus (program server) connected to the communication network (N), the data of the program can be taken into the electronic apparatus having a display function and stored in the storage device to achieve the measurement data analytical and graphing functions.

The embodiments described above are not intended to limit the scope of the inventions of the present application, and may be modified in a variety of other forms without departing from the spirit of the inventions. Further, the embodiments include various stages of the invention, and various other inventions might be derived from appropriately combined constituent components. For example, some of the constituent components of the embodiments may be omitted or combined into a different format, but the problem of the invention and the effect of the invention described herein in the present disclosure would also be achieved. Therefore, such combinations or omissions of the constituent components can be extracted as inventions.

What is claimed is:

1. An electronic apparatus, comprising:
   at least one processor; and
   at least one memory storing instructions, wherein
   the instructions are executed by the at least one processor to perform:
   identifying at least one scientific theoretical formula relating to one or more scientific characteristics of which data is measured,
   setting a coordinate system that includes a coordinate axis to which at least a part of the identified at least one scientific theoretical formula is assigned, and
   plotting the measured data of the one or more scientific characteristics on the set coordinate system to display a first graph on a display.

2. The electronic apparatus according to claim 1, wherein the at least one processor, under the instructions, performs automatically setting, in a case where only one scientific theoretical formula is identified, the coordinate system including the coordinate axis to which at least a part of the only one scientific theoretical formula is assigned.

3. The electronic apparatus according to claim 1, wherein the at least one processor, under the instructions, performs accepting, in a case where a plurality of scientific theoretical formulas is identified, a user operation selecting to identify one of the plurality of scientific theoretical formulas.

4. The electronic apparatus according to claim 1, wherein the at least one processor, under the instructions, performs automatically setting, in a case where no scientific theoretical formula is identified, a coordinate system including a time axis and a coordinate axis to which the measured data of the one or more scientific characteristics is assigned, as the coordinate system.

5. The electronic apparatus according to claim 1, wherein the at least one processor, under the instructions, performs accepting, in a case where no scientific theoretical formula is identified, a user operation designating a coordinate axis of the coordinate system, and
setting, in accordance with the accepted user operation, the coordinate system including the designated coordinate axis as the coordinate system.

6. The electronic apparatus according to claim 1, wherein the at least one processor, under the instructions, performs setting the identified scientific theoretical formula to a regression formula,
calculating a coefficient of the regression formula in accordance with the measured data of the one or more scientific characteristics, and
displaying a second graph together with the first graph on the coordinate system displayed on the display, the second graph corresponding to the regression formula to which the calculated coefficient is inserted.

7. The electronic apparatus according to claim 1, wherein the at least one processor, under the instruction, performs identifying the at least one scientific theoretical formula selected from among a plurality of scientific theoretical formulas stored in the at least one memory.

8. The electronic apparatus according to claim 1, wherein the at least one processor, under the instructions, performs identifying the at least one scientific theoretical formula relating to the one or more scientific characteristics of which data is measured by a sensor.

9. The electronic apparatus according to claim 1, further comprising:
   the display.

10. An electronic apparatus system, comprising:
    an electronic apparatus; and
    at least one sensor,
    the electronic apparatus including
    at least one processor, and
    at least one memory storing instructions, wherein the instructions are executed by the at least one processor to perform:
identifying at least one scientific theoretical formula relating to one or more scientific characteristics of which data is measured,
setting a coordinate system that has a coordinate axis to which at least a part of the identified at least one scientific theoretical formula is assigned, and
plotting the measured data of the one or more scientific characteristics on the set coordinate system to display a first graph on a display, and
the at least one sensor measuring the data of the one or more scientific characteristics.

11. A graphing method, comprising:
identifying at least one scientific theoretical formula relating to one or more scientific characteristics of which data is measured; and
displaying a measurement result graph on a display, the measurement result graph being generated by setting a coordinate system that has a coordinate axis to which at least a part of the identified at least one scientific theoretical formula is assigned, and plotting the measured data of the one or more scientific characteristics on the set coordinate system.

12. The graphing method according to claim 11, wherein automatically setting, in a case where only one scientific theoretical formula is identified, the coordinate system including the coordinate axis to which at least a part of the only one scientific theoretical formula is assigned.

13. The graphing method according to claim 11, wherein accepting, in a case where a plurality of scientific theoretical formulas is identified, a user operation selecting to identify one of the plurality of scientific theoretical formulas.

14. The graphing method according to claim 11, wherein automatically setting, in a case where no scientific theoretical formula is identified, a coordinate system including a time axis and a coordinate axis to which the measured data of the one or more scientific characteristics is assigned, as the coordinate system.

15. The graphing method according to claim 11, wherein accepting, in a case where no scientific theoretical formula is identified, a user operation designating a coordinate axis of the coordinate system, and
setting, in accordance with the accepted user operation, the coordinate system including the designated coordinate axis as the coordinate system.

16. The graphing method according to claim 11, wherein setting the identified scientific theoretical formula to a regression formula,
calculating a coefficient of the regression formula in accordance with the measured data of the one or more scientific characteristics, and
displaying a second graph together with the first graph on the coordinate system displayed on the display, the second graph corresponding to the regression formula to which the calculated coefficient is inserted.

17. A non-transitory computer-readable recording medium with an executable program stored thereon, wherein the program instructs a computer to perform:
identifying at least one scientific theoretical formula relating to one or more scientific characteristics of which data is measured; and
displaying a measurement result graph on a display, the measurement result graph being generated by setting a coordinate system including a coordinate axis to which at least a part of the at least one scientific theoretical formula identified by the identifying is assigned, and plotting the measured data of the one or more scientific characteristics on the set coordinate system.

18. The non-transitory computer-readable recording medium according to claim 17, wherein
the program instructs the computer to perform:
automatically setting, in a case where only one scientific theoretical formula is identified, the coordinate system including the coordinate axis to which at least a part of the only one scientific theoretical formula is assigned.

19. The non-transitory computer-readable recording medium according to claim 17, wherein
the program instructs the computer to perform:
accepting, in a case where a plurality of scientific theoretical formulas is identified, a user operation selecting to identify one of the plurality of scientific theoretical formulas.

20. The non-transitory computer-readable recording medium according to claim 17, wherein
the program instructs the computer to perform:
automatically setting, in a case where no scientific theoretical formula is identified, a coordinate system including a time axis and a coordinate axis to which the measured data of the one or more scientific characteristics is assigned, as the coordinate system.

21. The non-transitory computer-readable recording medium according to claim 17, wherein
the program instructs the computer to perform:
accepting, in a case where no scientific theoretical formula is identified, a user operation designating a coordinate axis of the coordinate system, and
setting, in accordance with the accepted user operation, the coordinate system including the designated coordinate axis as the coordinate system.

22. The non-transitory computer-readable recording medium according to claim 17, wherein
the program instructs the computer to perform:
setting the identified scientific theoretical formula to a regression formula,
calculating a coefficient of the regression formula in accordance with the measured data of the one or more scientific characteristics, and
displaying a second graph together with the first graph on the coordinate system displayed on the display, the second graph corresponding to the regression formula to which the calculated coefficient is inserted.

* * * * *